United States Patent [19]

Volk, Jr.

[11] Patent Number: 5,035,294
[45] Date of Patent: Jul. 30, 1991

[54] IN PLACE BIN WEIGHING DEVICE FOR BATCH WEIGHER

[75] Inventor: Joseph A. Volk, Jr., Creve Coeur, Mo.

[73] Assignee: Beta Raven Inc., Earth City, Mo.

[21] Appl. No.: 472,592

[22] Filed: Jan. 30, 1990

[51] Int. Cl.⁵ .................... G01G 19/22; G01G 21/24
[52] U.S. Cl. ...................................... 177/70; 177/255
[58] Field of Search ............... 177/70, 25.18, 229, 177/255, 58, 59

[56] References Cited

U.S. PATENT DOCUMENTS

| | | | |
|---|---|---|---|
| 3,034,590 | 5/1962 | Noble | 177/70 |
| 4,078,624 | 3/1978 | Bradley | 177/255 X |
| 4,222,448 | 9/1980 | Sunkle et al. | 177/70 X |
| 4,638,875 | 1/1987 | Murray | 177/70 X |
| 4,850,443 | 7/1989 | Bergholt et al. | 177/229 X |

Primary Examiner—George H. Miller, Jr.
Attorney, Agent, or Firm—Rogers, Howell & Haferkamp

[57] ABSTRACT

A bin weighing device for the individual bins of a batch weigher includes a plurality of flexures oriented in one or more horizontal planes to stabilize the bin and restrict its movement as the bin is supported at one end with a single load cell in a vertical direction in order to ascertain the weight of the bin and material contained therein. With the arrangement shown, a single load cell can be used along with the supporting flexures to accurately weigh a bin and its contents while the bin remains in place along with other bins mounted in a rack configuration on the batch weigher.

20 Claims, 3 Drawing Sheets

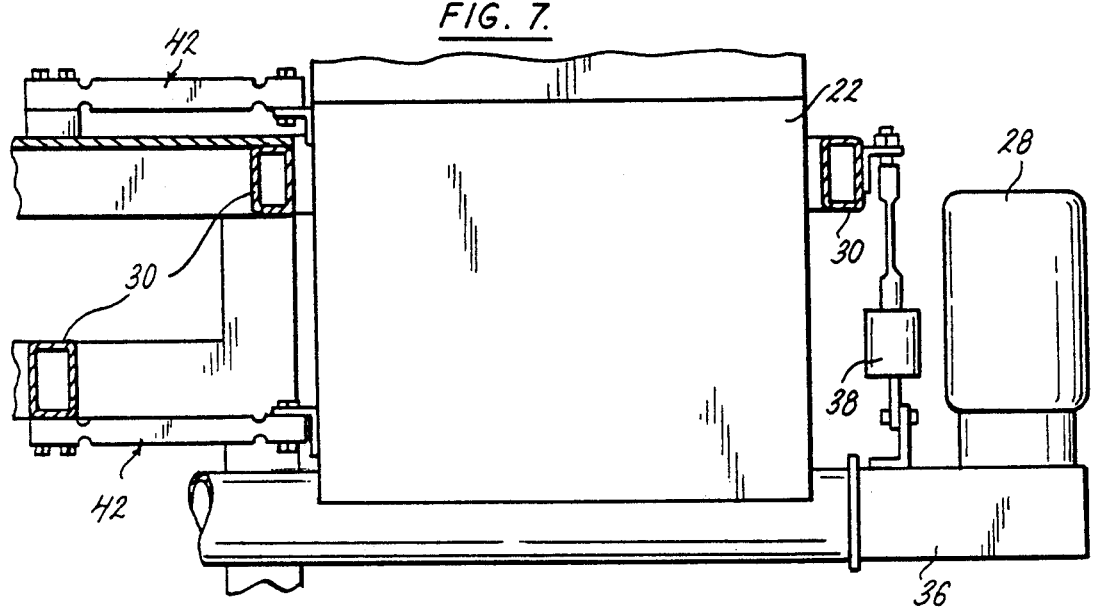
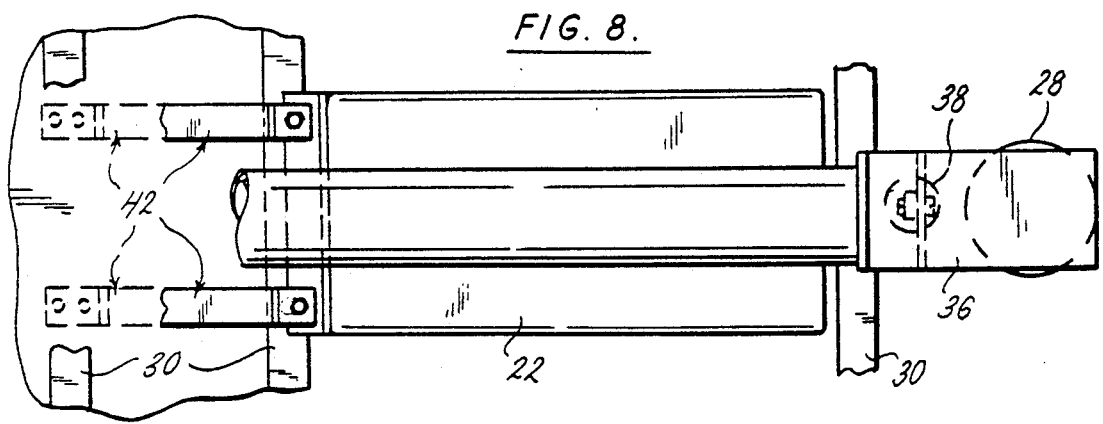
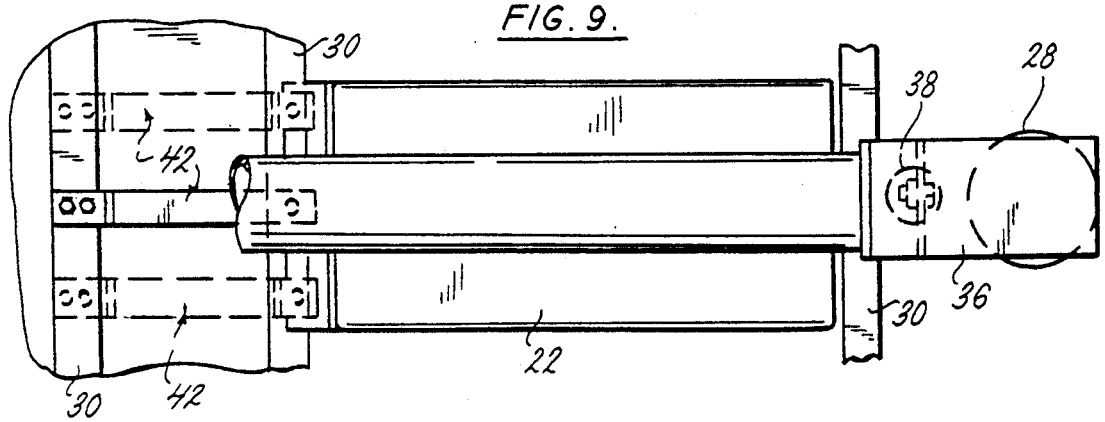

IN PLACE BIN WEIGHING DEVICE FOR BATCH WEIGHER

BACKGROUND AND SUMMARY OF THE INVENTION

A batch weighing device is well known in the prior art and generally includes a plurality of separate bins, each of which has a screw auger or the like for conveying a desired amount of each individual ingredient into a common hopper so as to create a batch of selected amounts of selected ingredients. One such typical system may include up to sixteen separate bins supported from a single framework and arranged in two banks of eight bins each, each bin weighing approximately 100 pounds and when filled weighing as much as 400-600 pounds. The common hopper is generally supported between the two banks by four load cells such that its weight may be accurately monitored and the cumulative weight of the mixture used to determine the amount of each ingredient to be added to the hopper.

These batch weighing systems may be used in applications wherein one or more of the ingredients are drugs falling under the regulation of the Food and Drug Administration (FDA). The FDA has recently issued guidelines for businesses utilizing batch weighing equipment of this design that require the operator to accurately ascertain the weight of the ingredient contained in the bin on a periodic basis. In the prior art, the amount of ingredient was determined through a volumetric reading obtained by measuring the level of ingredient in the bin against a measuring tape glued to the sidewall of the interior of the bin. However, volumetric readings have not satisfied the FDA such that weight measurements are now being required.

One solution to this in the prior art has been to removably mount the individual bins to the framework such that an overhead hoist may be used to individually lift the bins from the framework so that a digitized load cell in series with the hoist hook can measure the weight of the material contained within the bin. Not only is this method time-consuming and, hence, expensive, but it is also cumbersome to lift the bins individually from the framework and replace them. As a result, material commonly falls from the end of the bins auger which not only can result in loss of valuable ingredients, but can also result in contamination between bins of different ingredients.

An obvious solution to weighing each of the bins individually would be to support each bin by four load cells, much as is presently done with the common hopper. However, the load cells can be quite expensive. This additional expense would dramatically increase the cost of the batch weighing apparatus and therefore is not feasible as a solution to this problem.

To solve these and other problems in the prior art, and to enable the individual bins of a batch weighing apparatus to be weighed in place without their removal from the supporting framework, the inventor herein has succeeded in designing and developing a bin suspension system comprised of a plurality of flexures which, when coupled with a single load cell, can be used to accurately weigh each individual bin and its contents. Thus, only a single additional load cell is required for each bin with the result being that the continuous instantaneous weight of each bin so equipped is known.

Simply put, the plurality of flexures are used to restrict movement of the bin to substantially a vertical direction as the bin is loaded with ingredient. A single load cell is interconnected between the bin and the supporting framework and serves as substantially the only support for the bin in the vertical direction. With this arrangement, the output of the load cell thus represents the weight of the bin and its contents.

The type of flexure used can be either one of two designs as proposed herein. The first of these is essentially a turnbuckle with rod end bearings. These flexures, or links, are oriented in a horizontal plane and extend between two sides of the bin and the supporting framework. The links are oriented at angles with respect to each other in the same grouping so as to prevent tilting of the bin sideways about its vertical axis. Additionally, the links are grouped at each side, with groups for different sides lined in different horizontal planes such that the bin is permitted to tilt or cant slightly as it moves up or down. This minimizes compression and tension in the links as the bin moves and also facilitates freer movement of the bin in the vertical direction to provide greater accuracy in the weighment of the bin. Alternately, the links may be oriented into a three or four legged parallelogram extending from the inboard side of the bin to the framework. In this configuration, the movement of the bin is generally arcuate and is thought to be more vertical and, hence, more accurate.

Still another type of flexure proposed by the inventor comprises a steel bar, perhaps one inch square, with all but one-tenth of an inch drilled out along the width of the bar near each of the two connection points to provide flex joints therein. With this type of link, it is thought that a reduced number of links may be used as the flex joints formed in the steel bar have an orientation which naturally prevent flexing other than along the length dimension of the bar. Thus, separate links oriented angularly to the others need not be provided to prevent movement of the bin sideways with respect to its vertical axis.

As shown in the preferred embodiments, the load cell may be placed on the outboard side of each bin for ease in access, adjustment, and retrofit installation, if required. With this arrangement, and the arrangement of the flexures as shown, the flexures are placed in compression which is believed to detract from the accuracy of the weighment. Alternately, a platform type load cell may be placed beneath each bin at approximately its center of gravity so as to eliminate either compression or tension being placed in the flexures. While this may provide additional accuracy in measuring each weighment, the load cell is not nearly as accessible and is also more expensive. In a typical batch weighing device, each load cell has a movement between 0.005" (five thousandths of an inch) and 0.050" (fifty thousandths of an inch) to measure the difference between an empty bin and a full bin. With this small amount of movement, it is not believed that meaningful additional accuracy may be attained through use of a platform type load cell, when compared to the additional expense required. However, from a theoretical standpoint, central placement of the load cell may improve accuracy.

With the flexures and load cell of the present invention, accurate weighments of each individual bin may be made without removing the bin from the supporting framework. Furthermore, very little additional mechanical complexity is required along with only a single load cell. Therefore, continuous, on-line measurement of the weight of each ingredient is available and the shutting down of the apparatus to individually lift each bin therefrom to obtain weighments is eliminated. It is believed that this invention provides significant advantages over the prior art in meeting the FDA requirements recently imposed.

While the principal advantages and features of the invention have been noted above, a greater understanding of the invention may be attained by referring to the drawings and description of the preferred embodiment which follow.

BRIEF DESCRIPTION OF THE DRAWINGS

FIG. 7 is a side view of an individual bin using the same flexures as in the second embodiment but with different placement thereof;

FIG. 8 is a bottom view of an individual bin having flexures positioned at each of four points on the inboard side of the bin; and FIG. 9 is a bottom view of an alternative arrangement to that shown in FIG. 8 which shows the location for three flexures on the inboard side of the bin.

DETAILED DESCRIPTION OF THE PREFERRED EMBODIMENT

Figure 1:
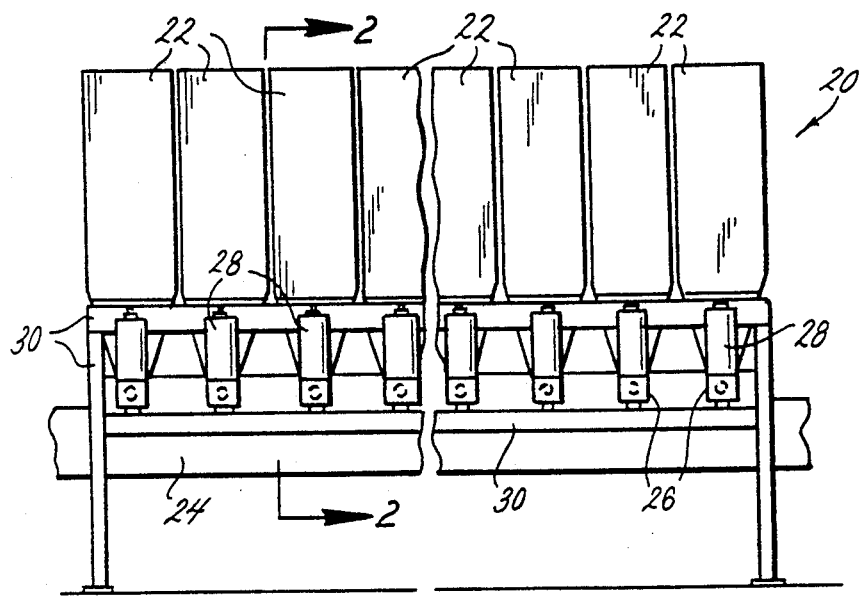
FIG. 1 is a side view of a batch weighing device with a plurality of individual bins.

As shown in FIG. 1, a multi bin batch weighing apparatus 20 includes a plurality of individual bins 22 which may be mounted in banks on opposite sides of a common weigh hopper 24 to receive ingredients which are transported from the bins 22 by a screw auger 26 driven by a screw motor 28. The weigh hopper 24 is commonly supported by a plurality of load cells (not shown) and the ingredients may be individually weighed into the weigh hopper 24 by keeping track of the cumulative weight of material contained within the weigh hopper 24, as is known in the art. The individual bins 22 and weigh hopper 24 are all supported by framework 30 to form a free-standing, self-contained unit.

Figure 2:
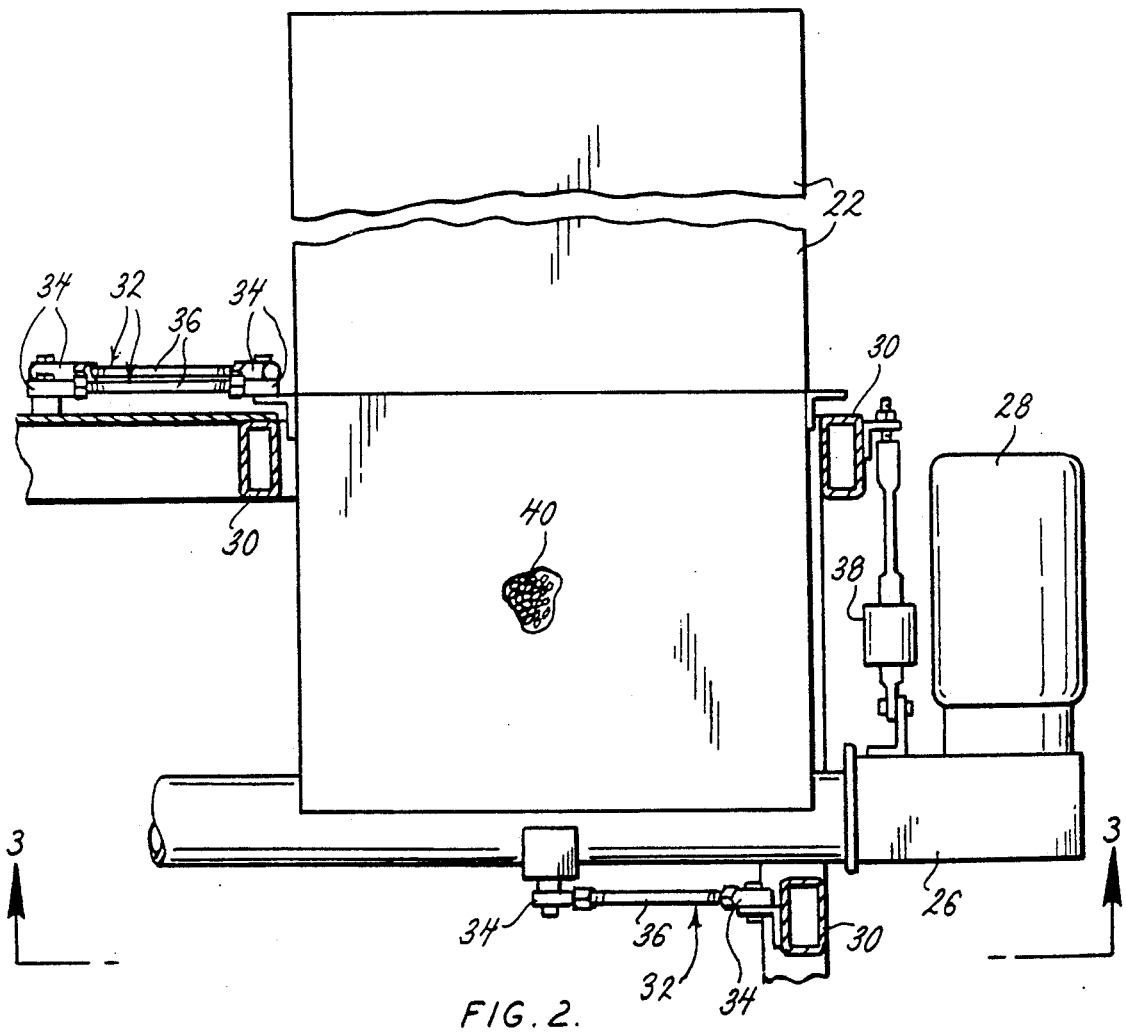
FIG. 2 is a partial cross-sectional view taken along the plane of line 2—2 in FIG. 1 and detailing a first embodiment of the bin weighing device of the present invention.
Figure 3:
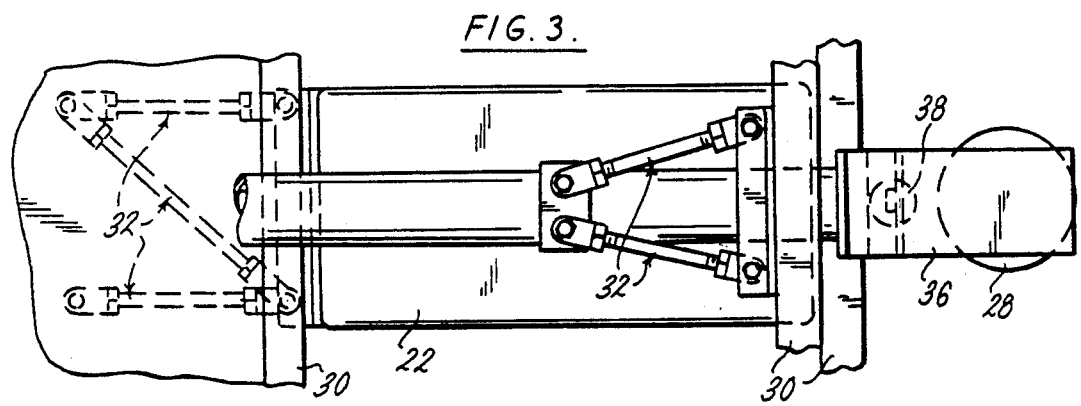
FIG. 3 is a bottom view taken along the plane of line 3—3 of FIG. 2 and detailing the location of flexures securing the bin to its support.

As shown in FIGS. 2 and 3, an individual bin 22 may be supported by a plurality of flexures 32 which are aligned in a generally horizontal plane, with flexures 32 at the inboard side of bin 22 being in a different horizontal plane than those mounted to the bottom of bin 22. Each flexure 32 may include a rod end bearing 34 at each end thereof with a turnbuckle 36 extending therebetween with one rod end bearing 34 having a connection with right hand threads and the other rod end bearing 34 having a connection with left hand threads such that the turnbuckle 36 may be rotated to either shorten or lengthen the flexure 32, as is well known in the art. As shown in greater detail in FIG. 3, two such flexures 32 are mounted and extend between the bottom of the bin 22 and the support frame 30. These flexures 32 are angled with respect to each other in order to prevent sideways tilting of the bin 22 about its vertical axis. Similarly, three such flexures 32 are mounted and extend between the inboard side of the bin 22 and the supporting framework 30, with one of the flexures 32 extending substantially diagonally between the other two flexures 32 to also resist sideways tilting of the bin 22 sideways about its vertical axis. A load cell 38 is connected at one end to the supporting framework 30 and at its other end to the bin 22. Thus, as material 40 fills bin 22 the inboard side of bin 22 has a tendency to pivot counterclockwise as the load cell 38 and its connection points represent substantially the only support for the bin 22 and its contents 40 in the vertical plane. However, there is relatively little movement in bin 22 position as it is loaded from zero to full capacity such that the accuracy of the reading made by load cell 38 is sufficient to determine the weight of the material 40 in the bin 22.

Figure 4:
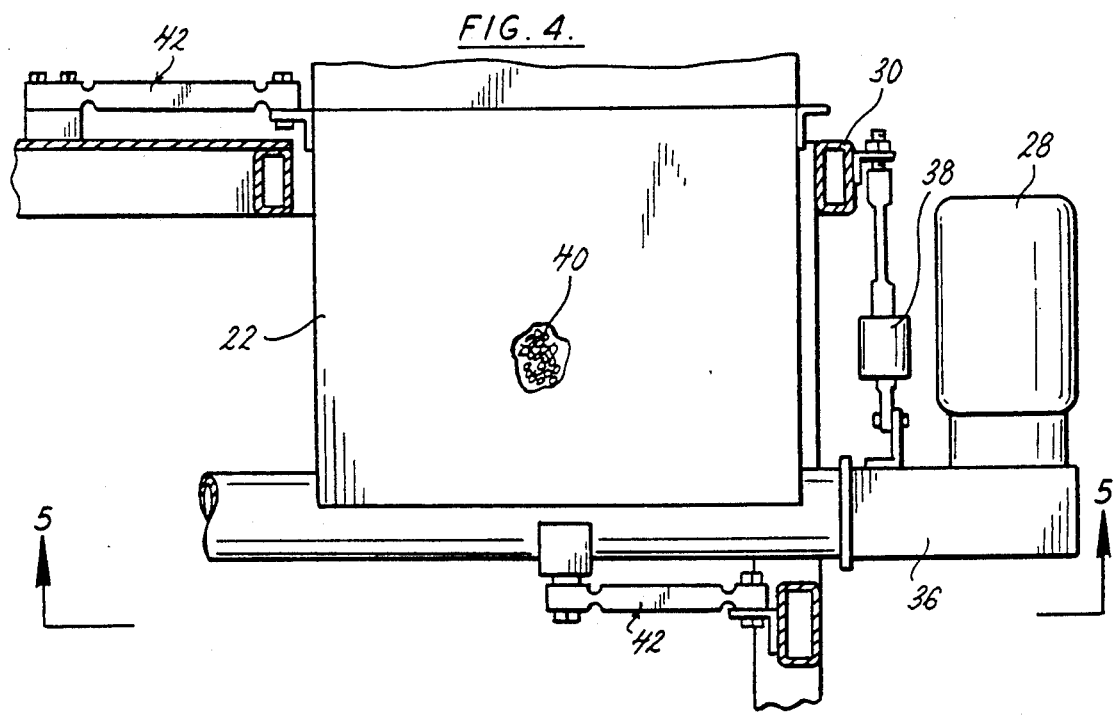
FIG. 4 is a side view of an individual bin with the second embodiment of the present invention utilizing different flexures.
Figure 5:
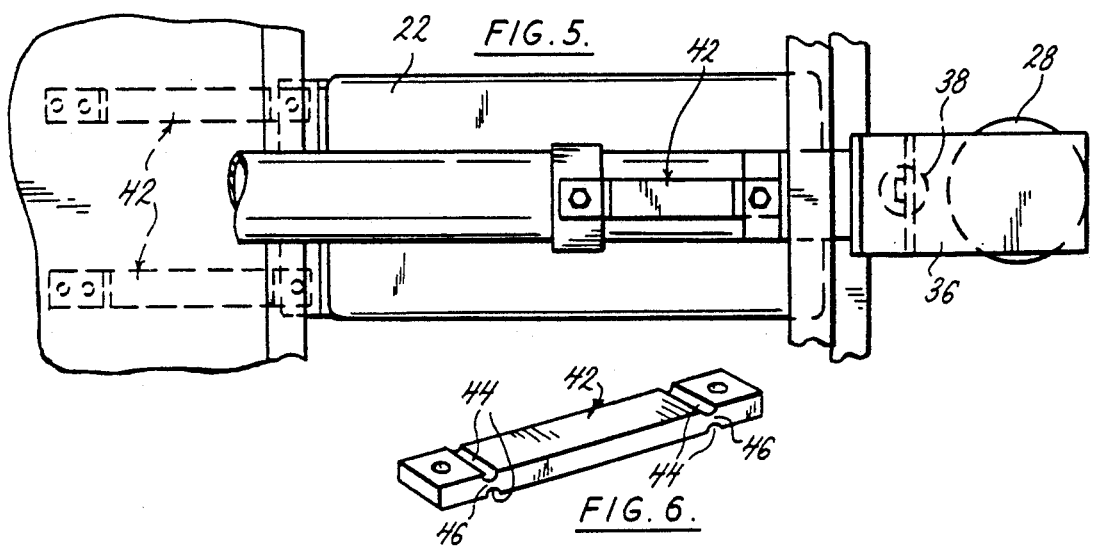
FIG. 5 is a bottom view taken along the plane of line 5—5 in FIG. 4 and detailing the mounting arrangement for the flexures of the second embodiment.
Figure 6:
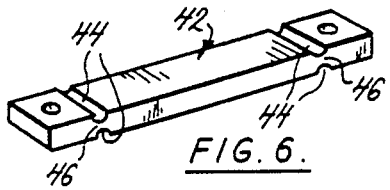
FIG. 6 is a perspective view of an individual flexure as used in the second embodiment.

In an alternate embodiment as shown in FIGS. 4-6, three flexures 42 are used to restrain the movement of the bin 22 instead of flexures 32 as shown in FIGS. 1-3. These flexures 42 are positioned with two at the inboard side of bin 22 and one flexure 42 mounted and extending between the bottom of the bin 22. As shown in FIG. 6, each flexure 42 is essentially made from a steel bar or rod which has a pair of aligned grooves 44 drilled through its width on opposite sides of the flexure 42 to create a flex joint or hinge 46. As can be seen from FIG. 6, each hinge 46 is oriented to resist twisting or flexing of the flexure 42 along any plane other than a vertical plane aligned with the length dimension of the flexure 42. Thus, hinges or flex joints 46 restrict sideways tilting of the bin 20 about its vertical axis. As with the first embodiment, a load cell 38 is mounted and extends between the supporting framework 30 and the bin 22. Similarly, as with the first embodiment, the bin 22 has a tendency to tilt inboard or rotate counterclockwise as it is loaded with material. However, as with the first embodiment, as the range of motion for the bin 22 is relatively small, load cell 38 picks up this movement and converts it to an output representative of the weight of the material 40 contained within the bin 22.

A third embodiment is shown in FIGS. 7-9 and essentially comprises relocating flexures 42 as shown therein. In this embodiment, a plurality of flexures (either four as shown in FIGS. 7 and 8; or four as shown in FIGS. 7 and 9) are connected to and extend between the inboard side of bin 22 and the supporting framework 30 such that the vertical movement of the bin 22 is controlled by a parallelogram formed by flexures 42. As with the preceding embodiments, the movement of bin 22 is relatively minor as it moves up and down in response to the weight of the material contained within the bin 22. However, in the third embodiment, the bin 22 is restricted to move in an arc defined by the parallelogram of flexures 42. The inventor believes that this controlled arcuate movement may more closely approximate a true vertical movement and hence result in more accurate readings when compared to those obtainable with the other embodiments.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a device having a framework, a plurality of bins supported from said framework, each of said bins having means for holding an ingredient in bulk form in a quantity significantly greater than that required for a single batch thereof to thereby permit continuous operation of said device to prepare multiple batches of said ingredients, and means for feeding a desired amount of said ingredients directly from each of said bins into a common hopper to thereby form a batch of said ingredients, the improvement comprising at least one of said bins having means for weighing in place said at least one bin and its contents with a single load cell.

2. The device of claim 1 wherein said weighing means further comprises a suspension system for permitting and controlling the movement of the bin as the weight of its contents varies.

3. The device of claim 2 wherein said suspension system has means for restricting movement of the bin in the horizontal plane.

4. The device of claim 3 wherein said suspension system comprises a plurality of links connected to and extending between the framework and its associated bin, said links flexing under load to permit substantially vertical movement of said bin and said load cell being oriented to support the bin in the vertical plane to thereby weigh it.

5. The device of claim 4 wherein at least some of said links comprise a turn buckle with end bearings.

6. The device of claim 4 wherein at least some of said links comprise steel rods with one or more areas of reduced thickness defining flex joints therein.

7. The device of claim 6 wherein said flex joints have reduced thickness through one dimension only to thereby define a flex plane.

8. The device of claim 4 wherein a plurality of bins in said device each has its own weighing means.

9. The device of claim 4 wherein said links are each substantially horizontally oriented.

10. The device of claim 9 wherein the links are connected to different sides of said bin, and the links connected to one side of the bin are in a different horizontal plane than those connected to another side of the bin.

11. The device of claim 10 wherein said suspension system has means for preventing tilting of the bin sideways about its vertical axis.

12. The device of claim 11 wherein said tilting prevention means comprises orienting some of said links at an angle with respect to others of said links.

13. The device of claim 11 wherein said tilting prevention means comprises links having flex joints which resist flexing sideways about the bin vertical axis.

14. In a device having a framework, a plurality of bins supported from said framework, each of said bins having means for holding an ingredient in bulk form in a quantity significantly greater than that required for a single batch thereof to thereby permit continuous operation of said device to prepare multiple batches of said ingredients, and means for feeding a desired amount of said ingredients directly from each of said bins into a common hopper to thereby form a batch of said ingredients, the improvement comprising a plurality of flexures connected between one of said bins and the framework, said flexures restricting movement of the bin to substantially a vertical direction in response to the loading of the bin, and a load cell connected between the framework and the bin so that the load cell output is substantially representative of the weight of the bin and its contents.

15. The device of claim 14 wherein said flexures are arranged in a parallelogram.

16. The device of claim 15 wherein said flexures forming the parallelogram are mounted to one side of the bin and the load cell is mounted to the opposite side of the bin.

17. The device of claim 14 wherein said flexures are all generally horizontally oriented.

18. The device of claim 17 wherein said flexures further comprise means for resisting canting of the bin sideways about its vertical axis.

19. The device of claim 18 wherein said canting resisting means comprises flexures having flex joints which resist flexing except along the length of the flexure.

20. The device of claim 18 wherein said canting resisting means comprises mounting of said flexures at angles to each other.

* * * * *